United States Patent [19]

Veach et al.

[11] 3,980,881

[45] Sept. 14, 1976

[54] SIMULTANEOUS LOGGING SYSTEM FOR DEEP WELLS

[75] Inventors: Charley L. Veach, Alvord; Wesley E. Ferguson; Ralph Wiley, both of Fort Worth, all of Tex.

[73] Assignee: The Western Company of North America, Fort Worth, Tex.

[22] Filed: Nov. 1, 1974

[21] Appl. No.: 519,987

[52] U.S. Cl. .............................. 250/261; 250/253; 250/256; 340/18 CM
[51] Int. Cl.² ...................... G01V 1/22; G01V 1/40; G01V 5/00
[58] Field of Search ........... 250/253, 261, 262, 263, 250/264, 265, 269, 270, 257, 256, 259; 340/18 R, 18 CM, 18 DC; 324/10, 11

[56] References Cited
UNITED STATES PATENTS

| | | | |
|---|---|---|---|
| 2,433,554 | 12/1947 | Herzog | 250/261 |
| 2,686,268 | 8/1954 | Martin et al. | 250/256 |
| 2,760,078 | 8/1956 | Youmans | 250/261 |
| 2,842,695 | 7/1958 | Goodman | 250/261 |
| 3,368,195 | 2/1968 | Peterson | 340/18 CM |
| 3,495,212 | 2/1970 | Brock | 340/18 CM |

Primary Examiner—Alfred E. Smith
Assistant Examiner—Tommy P. Chin
Attorney, Agent, or Firm—Mason, Kolehmainen, Rathburn & Wyss

[57] ABSTRACT

An improved well logging system of the type utilizing a single conductor cable to provide power from the surface equipment to a down hole subsurface unit and for simultaneously supplying current mode telemetry signals from one or more radiation detectors in the subsurface unit to the surface equipment. The surface equipment includes a power supply for the subsurface unit comprising a constant current source having a high output impedance connected to a series pass voltage regulator having a low output impedance. A switching mode voltage regulator is employed within the subsurface unit to compensate for variations in the voltage supplied to the subsurface unit which result from variations in cable resistance and other factors.

The subsurface unit includes circuitry capable of operating at the high temperature encountered in deep wells for an extended period of time and which transforms the detector output signals into corresponding current mode telemetry signals which are supplied over the single conductor cable to the low impedance output terminals of the series pass voltage regulator at the surface. The current mode signals are transformed by the series pass voltage regulator and appear as amplified voltage signals at the high impedance junction of the constant current source and the series pass regulator. Demultiplexing and recording circuitry is connected to the aforementioned junction to receive the amplified voltage signals and develop corresponding rate meter signals which may be applied to a recorder in the surface equipment.

27 Claims, 4 Drawing Figures

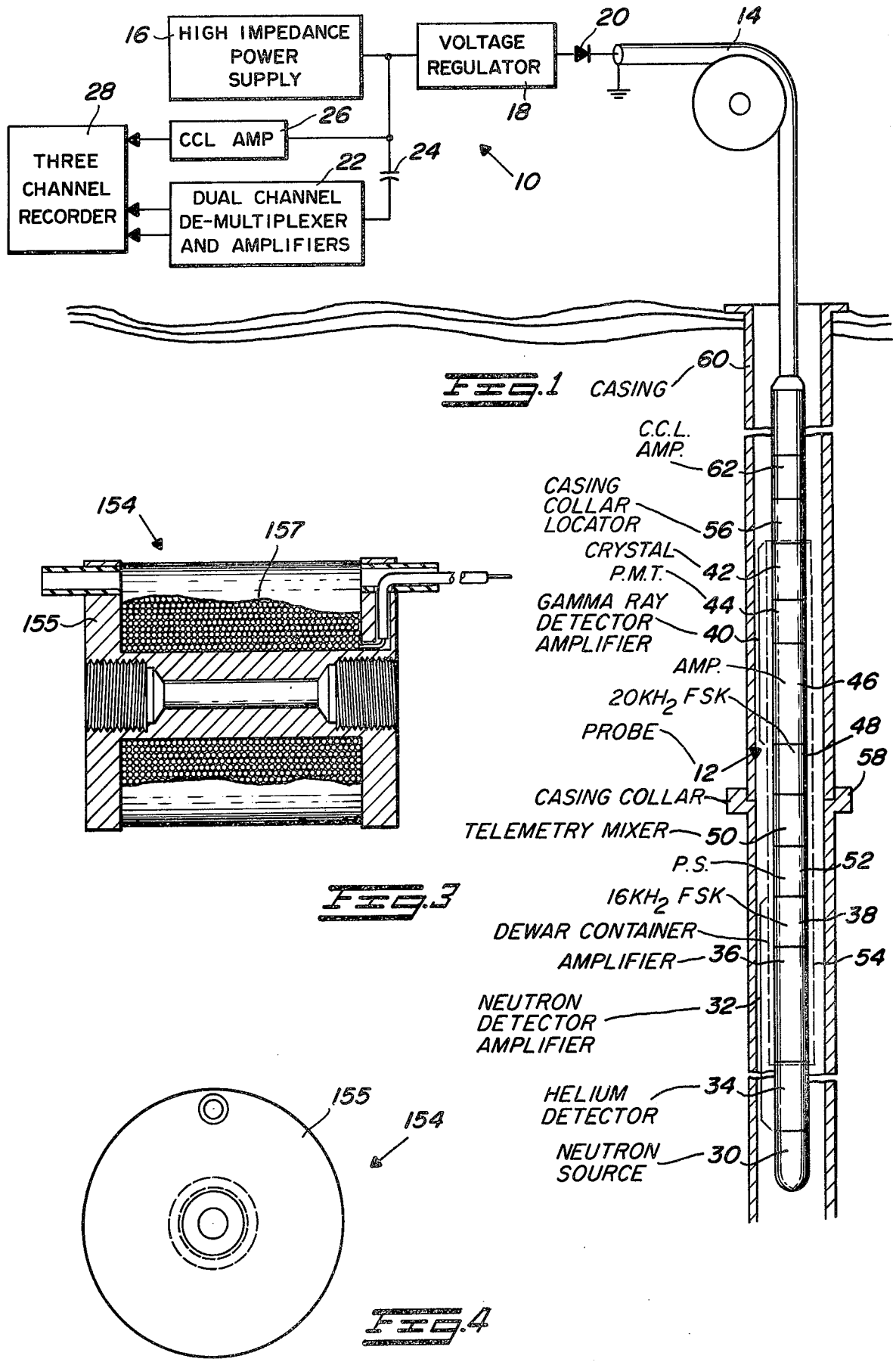

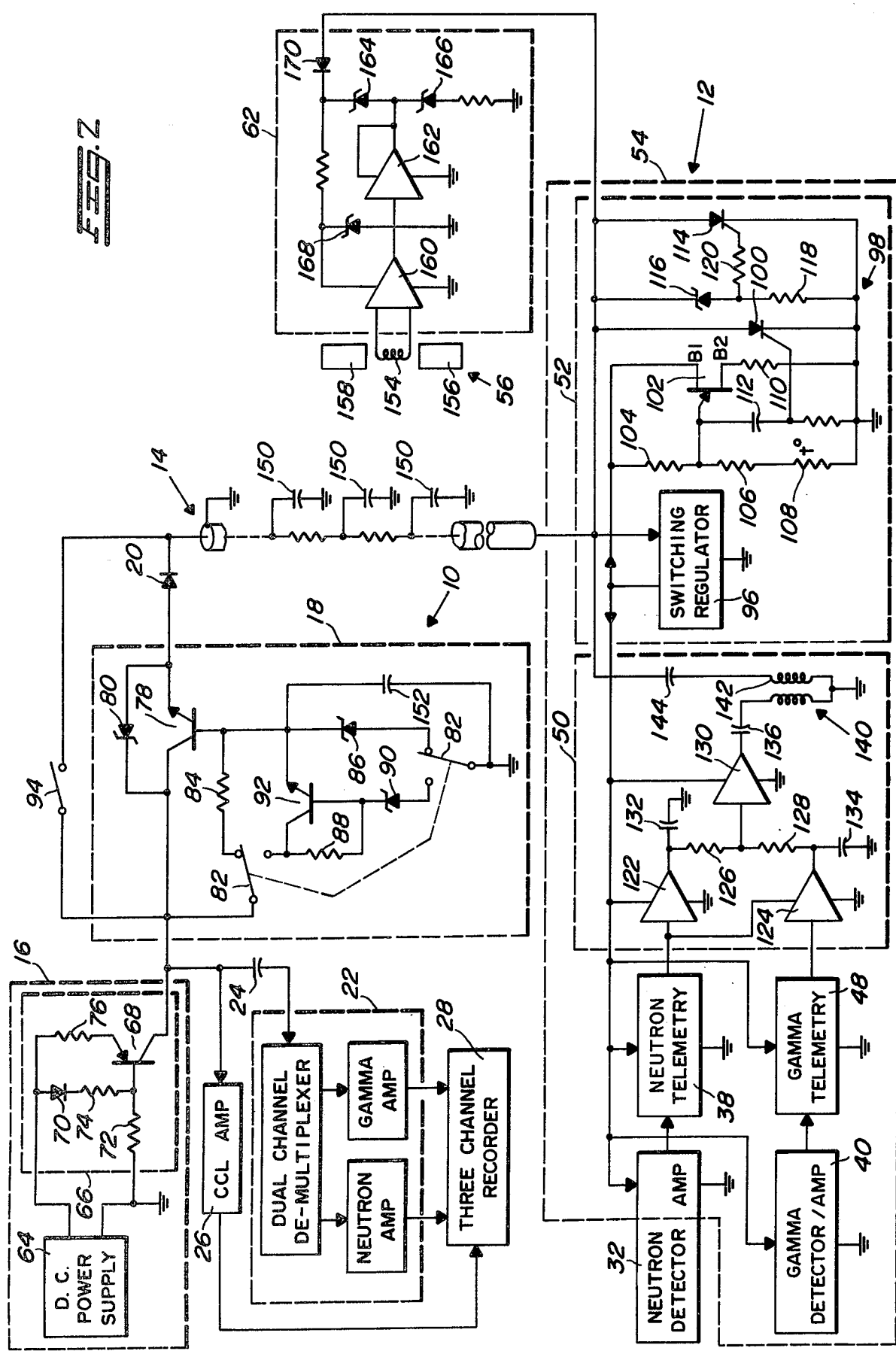

SIMULTANEOUS LOGGING SYSTEM FOR DEEP WELLS

BACKGROUND OF THE INVENTION

This invention relates generally to single conductor well logging systems, and more particularly, to simultaneous logging systems of the type which employ a single conductor cable to supply power to the subsurface unit for the radiation detectors located therein and to transmit the detector output signals to the surface as well as casing collar signals indicative of the depth of the subsurface unit.

Single conductor logging systems are well known. For example, in Scherbatskoy U.S. Pat. No. 2,740,053, there is disclosed a single conductor simultaneous well logging system in which pulses from the top detectors are transmitted up the cable as voltage pulses of opposite polarity. However, when such a system is used to log deep wells, the transmitted pulses are severely attentuated by the series resistance and shunt capacity of the cable so that it is hard to get meaningful information from the pulses when they arrive at the surface. This attenuation of the pulse type signals occurs in deep wells, which may be up to 30,000 feet in depth even when only a single detector is used in the logging system since the voltage pulse applied to the bottom end of the cable must charge the capacity of the entire length of the cable in order to appear as a recognizable voltage pulse at the surface.

Also, the logging unit must be protected from the intense heat (up to 400°F.) that is often encountered in deep wells without making the subsurface unit large and cumbersome. While some arrangements heretofore proposed have enclosed the detector and associated circuitry in a Dewar container within the subsurface housing, such a Dewar container prevents the dissipation of the heat generated by the detector and electronic circuitry positioned within this container. Therefore, the power dissipated by the circuitry within the Dewar container must be held to an absolute minimum to prevent the excessive buildup of heat within the Dewar container. If this is not done, the length of time that continuous logging measurements can be made will be severely limited. In deep wells where heavy drilling mud is used, a long time is consumed for the subsurface unit to fall to the bottom of the well. Accordingly, the subsurface unit may be called upon to withstand high temperatures for as much as ten hours without malfunctioning.

Finally, the varying resistance of the cable as the subsurface unit is lowered into the well causes variations in the power actually supplied to the subsurface unit, thereby necessitating some sort of voltage stabilization circuitry in this unit. Prior art systems have utilized a constant current regulated supply at the surface and the operator adjusts this supply at the surface to get a fixed value of current down hole irrespective of line length. Since the current applied to the line remains relatively constant even though the resistance of the cable varies as it is paid out over the pulley, a relatively constant voltage can be provided for the subsurface unit by passing the constant current through a resistor within the subsurface unit and utilizing the voltage thus developed to power the probe. This system has several disadvantages. Usually, constant voltage supplies utilizing a constant current source and a resistor dissipate far too much power to be included within the Dewar container and yet such a supply cannot itself operate satisfactorily at 400° F. Furthermore, the high output impedance of the constant current source permits large voltage fluctuations to exist on the line. As a result, the logging signals from the subsurface unit appear across the cable as fluctuating voltage signals which tend to charge and discharge the shunt capacity of the line. This charging and discharging of the line serves to attenuate the logging signals and limits the maximum length of the line that may be used before the logging signals are obscured. On the other hand, if a constant voltage regulated supply is used at the surface, the voltage actually applied to the subsurface unit will vary excessively. Furthermore, a low impedance is presented to the cable by this supply which will further tend to attenuate signals transmitted over the cable.

In single conductor logging systems it is also desirable to convert the detector signals to telemetry signals of the type described in copending McLaughlin et al application Ser. No. 400,174 filed Sept. 20, 1973 now U.S. 3,529,749 and transmit these telemetry type signals to the surface for processing and recording. Such telemetry signals extend the maximum pulse rates from the detector that can be transmitted without causing pulse overlap in the cable with voltage pulse type transmission over the cable, but do not solve the problems resulting from the cable attenuation itself.

SUMMARY OF THE INVENTION

Accordingly, it is an object of the present invention to provide an improved well logging system which avoids one or more of the above discussed disadvantages of prior art arrangements.

It is another object of the present invention to provide an improved single conductor cable well logging system suitable for logging deep wells wherein power may be sent over the cable to the subsurface unit, and detector signals may be transmitted from the subsurface unit over a long length of the cable and still retain their usefulness at the surface in providing a suitable log.

Yet another object of the present invention is to provide a well logging system in which the subsurface unit may be maintained in a high temperature environment over extended periods of time.

A still further object of the present invention is to provide a well logging system for very deep wells that utilizes a single conductor cable for the logging unit and wherein logging information is transmitted in the form of current signals which do not substantially charge the capacity of the cable as they occur.

Another object of the present invention is to provide a well logging system for very deep wells that utilizes a single conductor cable for the logging unit and employs suitable circuitry in the logging unit and at the surface to transmit and receive telemetry type signals corresponding to the detected radiation signals while at the same time providing a current mode of transmission of said telemetry signals over said cable.

In accordance with a preferred embodiment of the invention, the surface unit comprises data recording equipment and a power supply for the down hole unit. The power supply includes a high output impedance power source, such as a constant current source, connected in tandem with a series pass voltage regulator. The series pass voltage regulator has a variable input impedance connected to the constant current source and provides a low impedance termination to the logging cable while at the same time providing amplification of current signals flowing in the cable. This combination also provides a regulated DC voltage which is transmitted down the cable to the subsurface unit.

A second voltage regulator is located within the subsurface unit to correct for variations in voltage resulting from variations in the resistance of the cable as the subsurface unit is lowered into the wall. A switching type voltage regulator is used to minimize the amount of power dissipated in the subsurface unit and to permit the switching regulator to be placed within the Dewar container without excessively raising the temperature inside the container. The subsurface unit also includes a neutron detector and a gamma ray detector, each coupled to a frequency shift keyed modulator. The signals from the neutron and gamma ray modulators are combined and applied through a step down transformer to the center conductor of the cable so that the mixer amplifier is matched to the low impedance logging cable and current signals are developed in this cable which are transmitted to the surface. A casing collar detector, which is able to withstand high temperatures and is positioned outside the Dewar container, is employed to develop casing collar signals which are also coupled to the bottom end of the cable as current signals and are transmitted up the cable. In addition, an over voltage and over temperature sensor is located within the subsurface unit to disable the operation of the logging circuitry if the temperature or voltage exceeds a predetermined safe level.

Because the cable is terminated by the low output impedance of the series pass voltage regulator at the surface, virtually no signal voltage appears across the cable. For this reason prior art systems did not use voltage regulators on the telemetry cable because the signal voltage was very difficult to detect. However, the lack of a substantial signal voltage across the cable is used to advantage in the present invention. Because current mode signals are transmitted there is very little voltage variation across the cable, and the shunt capacitance of the cable is not continuously charged and discharged by the telemetry signals from the logging unit. As a result, the telemetry signals are not shunted to ground by the shunt capacitance of the line, and much longer cables may be used without losing resolution of the telemetry signals.

Although very little telemetry signal voltage appears across the cable, the low output impedance of the voltage regulator permits large telemetry signal currents to flow through the cable. These current mode telemetry signals flow through the low impedance output circuit of the series pass voltage regulator and are transformed and amplified so that they appear as voltage varying signals at the junction of the constant current source and the input of the series pass regulator. A demultiplexer circuit is connected to the junction of the constant current source and the input of the series pass voltage regulator to receive these varying voltage signals and recover the neutron and gamma ray information. In addition, an amplifier circuit responsive to low frequency pulses from the casing collar locator may be connected to the junction of the constant current source and the input to the series pass regulator. A multi-channel recorder is connected to the outputs of the demultiplexer and the casing collar location amplifier to provide a permanent record of the detector outputs as the well is logged.

The above and other objects and advantages of the present invention will appear from the following detailed description of the invention in connection with which reference is made to the accompanying drawings, wherein:

FIG. 1 is an overall diagram of the well logging system according to the invention showing the surface and subsurface units, wherein the surface unit is shown in block diagram form;

FIG. 2 is a combined block and schematic diagram showing the electronics of the well logging system in greater detail;

FIG. 3 is a side sectional view of the casing collar detecting coil employed in the subsurface unit of FIGS. 1 and 2; and FIG. 4 is an end view of the casing collar detecting coil depicted in FIG. 3.

DETAILED DESCRIPTION

A. General

Referring now to the drawings, with particular attention to FIG. 1, there is shown a well logging system having a surface unit, generally designated by the numeral 10, and a down hole probe or subsurface unit generally designated as 12. The surface unit 10 and subsurface unit 12 are interconnected by a coaxial cable 14 having a single central conductor and a conductive outer shield. The coaxial cable 14 transmits operating power from the surface unit 10 to the subsurface unit 12 and well logging signals from the subsurface unit 12 to the surface unit 10.

The outer shield of the coaxial cable 14 is fabricated from a plurality of steel cables that are wound around the insulated central conductor in a spiral fashion, and which support the subsurface unit as it is lowered into the well. Because the steel cables are structural cables rather than electrical cables, and because of the lack of precision with which the steel cables are wound around the central conductor, the electrical characteristics of the cable 14 are rather poor. The cable 14 has a high shunt capacitance and series resistance, and a generally undefined characteristic impedance, thereby making signal transmission on such a cable difficult.

According to an important aspect of the invention, the surface unit 10 includes an high output impedance power supply 16 connected in tandem with a voltage regulator 18. The voltage regulator 18 has an input having a variable input impedance and an output having a low output impedance. For purposes of the following discussion, an output impedance will be considered high if it is at least approximately an order of magnitude higher than the impedance of load being driven, and considered low if it is approximately an order of magnitude lower than the impedance of the driven load, or lower. The output of the voltage regulator 18 is connected to the cable 14 through a protective diode 20 which protects the subsurface unit 12 from reverse polarity voltages that might be accidentally applied to the line.

A dual channel demultiplexer and amplifier circuit 22 is connected to the junction of the high impedance power supply 16 and the voltage regulator 18 by means of a coupling capacitor 24. A casing collar location amplifier 26 is also connected to the junction of the power supply 16 and the voltage regulator 18. The casing collar location amplifier 26 includes a capacitor similar to the capacitor 24 for preventing the flow of DC current into the input of the amplifier 26. The outputs of the casing collar location amplifier 26 and the dual channel demultiplexer 22 are connected to a three channel recorder 28. The recorder 28 may include an oscilloscope and a chart paper recorder to provide a visual indication of the signals received from the subsurface unit 12.

The subsurface unit 12 contains apparatus for measuring a plurality of individual parameters of the well. A neutron source 30 is located in the subsurface unit 12 and contains a radioactive neutron emitting element. A neutron detector-amplifier combination 32 includes a neutron detector 34 comprising a container of pressurized helium gas in the form of $He_3$ which provides low level electrical signals in response to neutron bombardment. A small signal neutron amplifier 36 is provided for amplifying signals from the helium neutron detector 34. The output from the neutron amplifier 36 is applied to a 16 kilohertz frequency shift keyed telemetry circuit 38 for coding into a suitable form for transmission to the surface unit 10. The 16 kilohertz telemetry circuit 38 is similar to the one described in the copending U.S. Pat. application Ser. No. 400,174 filed Sept. 24, 1973 entitled A SYNCHRONOUS PULSED TELEMETRY SYSTEM AND METHOD, assigned to the same assignee as the assignee of the present invention and incorporated herein by reference.

A gamma ray detector-amplifier combination 40 containing a gamma ray responsive scintillation crystal 42, a photomultiplier tube 44 and a low level amplifier 46 is also located within the subsurface 12. The output of the amplifier 46 is connected to a 20 kilohertz frequency shift keyed telemetry circuit 48 similar to the 16 kilohertz telemetry circuit 38 and the telemetry circuits disclosed in the above mentioned reference. A telemetry mixer 50 is used to combine the output signals from the telemetry circuits 38 and 48 for transmission to the surface unit 10.

The gamma ray detector and the neutron detector are standard components well known in the art. A high voltage power supply is employed to energize the $He_3$ neutron detector and the photomultiplier tube. This high voltage supply is powered by a regulated switching power supply discussed below.

All of the subsurface unit components mentioned in the above discussion are powered by a voltage regulated switching power supply 52 containing over voltage and over temperature protection. The function of the power supply 52 is to remove the variations in the voltage applied to the subsurface unit 12 resulting from changes in the resistance of the cable 14 as the probe is lowered into the bore hole. A switching type regulator is used rather than an analog regulator because all of the above mentioned subsurface components with the exception of the neutron source 30 and the helium neutron detector 34 are encased in a thermally insulated housing such as a Dewar container 54, shown symbolically by dashed lines in FIG. 1, to protect the components from the high temperatures encountered in deep bore holes. Because of the thermal insulating properties of the Dewar container 54, any heat generated by the electronics located inside the Dewar container 54 is contained, and excessive heat dissipation by the electronics would cause an excessive temperature rise within the container 54, thereby limiting the maxium amount of time that continuous measurements could be made. Accordingly, a switching regulator has been employed within the power supply 52 to minimize the amount of heat dissipated by the power supply.

When deep wells are logged, the cable 14 supporting the subsurface unit 12 tends to stretch, thereby making it difficult to determine the exact depth of the probe. Accordingly, a casing collar locator 56 is employed to locate the casing collars 58 which connect sections of the casing 60 lining the bore hole. A casing collar location amplifier 62 is employed to receive signals from the casing collar locator 56 and amplify them for transmission to the surface unit 10. The casing collars serve as reference points to aid in the location of the subsurface unit within the bore hole.

B. Logging Circuitry

The circuitry of the well logging device is shown in greater detail in FIG. 2. In the present embodiment, the high impedance power supply 16 of the surface unit 10 contains a DC power supply 64 and a constant current source 66. The DC power supply 64 provides a direct current potential to the constant current source 66. The constant current source 66 illustrated in FIG. 2 is a simple form of constant current source, and comprises a transistor 68, a diode 70 and resistors 72, 74 and 76. The constant current source 66 illustrated in FIG. 2 is illustrative of a typical constant current source, and other variations thereof or other circuits providing a high output impedance may be used, and still fall within the scope and spirit of the invention.

In the embodiment shown, the DC power supply 64 establishes a substantially constant voltage across the series combination of the diode 70 and the resistor 74. The voltage appearing across the diode 70 is substantially equal to the voltage across the base to emitter junction of the transistor 68. As a result, the voltage appearing across the resistor 76 must be equal to the voltage appearing across the resistor 74. This causes the current supplied by the transistor 68 to be maintained at a substantially constant value of the magnitude necessary to maintain the voltage across the resistor 76 equal to the voltage across the resistor 74.

The voltage regulator 18 is a voltage regulator of the series pass type containing a series pass transistor 78 that is shunted by a zener diode 80. The zener diode 80 bypasses the transistor 78 and supplies additional current to a switching regulator (discussed below) in the subsurface unit when required during start up of the switching regulator. In the embodiment illustrated, the output voltage of the regulator 18 is adjustable to two different voltages by means of a double pole switch 82. When the armature of the switch 82 is positioned as shown, the voltage regulator 18 provides an output voltage of approximately 47 volts for use with a 5/16 inch diameter cable. When a higher resistance 3/16 inch diameter cable is used, the armature of the switch 82 is switched to its alternate position to cause the regulator 18 to provide an output voltage of approximately 60 volts.

When the switch 82 is positioned as shown in FIG. 2, current flows from the collector of the transistor 68 of the power supply 16 through a resistor 84 and a zener diode 86. The zener diode 86 provides a substantially constant voltage to the base of the transistor 78, thereby causing a substantially constant voltage to appear at the emitter of the transistor 78. With the switch 82 positioned in its alternate position, current flows through a resistor 88 and a zener diode 90 to thereby provide a substantially constant voltage to the base of a transistor 92. The transistor 92 acts as a current amplifier to provide a low impedance substantially constant voltage reference to the base of the transistor 78 without dissipating excessive power in the higher voltage zener diode 90.

A bypass switch 94 is provided around the regulator 18 and the diode 20. The function of the bypass switch 94 is to make the surface unit 10 compatible with existing subsurface units that require a constant current power supply. Bypassing the series pass regulator 18 directly connects the constant current source 66 to the cable 14 to provide a high output impedance usable with existing subsurface units.

The down hole end of the cable 14 is connected to the power supply 52. The power supply 52 contains a switching regulator 96 for compensating for the voltage variations appearing at the down hole end of the cable 14 as a result of the changes in the resistance of the cable 14 as the probe is lowered into the well. Because the power supply 52 is located within the Dewar container 54, a switching regulator is used because of its lower power dissipation rather than a series pass or shunt regulator. Such switching regulators are well known to those skilled in the art, and any switching regulator having an output voltage and current capacity compatible with the probe circuitry may be used. In the embodiment shown, the output voltage of the switching regulator must be maintained at a substantially constant 14 volts while the input voltage from the cable 14 varies over the range of 43 to 17 volts.

The power supply 52 also includes an over voltage and over temperature protection circuit generally designated by the reference numeral 98. The over temperature portion of the protection circuit includes a controlled rectifier 100, a unijunction transistor 102 and associated circuitry. A pair of resistors 104 and 106 and a thermistor 108 are connected to the emitter circuit of the unijunction 102. The unijunction transistor 102 is normally biased in an off state by the potential appearing at the junction of the resistors 104 and 106. When the potential at the junction of the resistors 104 and 106 approaches the potential at the base B2 of the unijunction transistor 102 as a result of excessive temperature, the unijunction transistor 102 fires and a pulse is applied to the gate of the controlled rectifier 100 through a capacitor 112. This renders the controlled rectifier 100 conductive, and shorts the center conductor of the cable 14 to ground potential.

The over voltage sensing circuit comprises a controlled rectifier 114 and a zener diode 116 and the associated resistors 118 and 120. The zener diode 116 senses the voltage appearing at the center conductor of the cable 14. If the voltage exceeds a predetermined safe level, the zener diode 116 breaks down and is rendered conductive. The conduction of the zener diode 116 applies a forward biasing voltage to the gate of the controlled rectifier 114 through the resistor 120 and renders the controlled rectifier 114 conductive.

If either one of the controlled rectifiers 100 or 114 is rendered conductive as a result of an over voltage or an over temperature condition, the center conductor of the cable 14 is grounded, and power is shunted away from the electronic circuitry in the probe 12. In the event of an over voltage condition, the circuitry is protected from the potentially damaging high voltage, and in the event of an over temperature condition, the circuitry is shut down to prevent further dissipation within the Dewar container 54 to prevent a further increase in the temperature. In either case, the transmission of telemetry signals is interrupted, thereby informing the operator of an abnormal condition.

The gamma detector-amplifier 40, the amplifier portion of the neutron detector-amplifier 32, the neutron telemetry circuit 38 and the gamma ray telemetry circuit 48 are all included within the Dewar container 54. The output signals from the neutron telemetry circuit 38 and the gamma ray telemetry circuit 48 are essentially frequency shift keyed square wave signals that are applied to the mixer 50, also within the Dewar container 54. The mixer 50 comprises a pair of amplifiers 122 and 124 for amplifying the telemetry signals from the respective telemetry circuits 38 and 40. The amplified signals from the amplifiers 122 and 124 are combined by a pair of resistors 126 and 128 and applied to an output amplifier 130. A pair of capacitors 132 and 134 are connected to to the outputs of the amplifiers 122 and 124, respectively, and serve to convert the square wave signals from the neutron telemetry circuit 38 and the gamma telemetry circuit 48 to substantially triangular wave signals to permit the telemetry signals to be more readily combined. The combined signal from the output amplifier 130 is applied to a primary 138 of an impedance matching transformer 140 by means of a coupling capacitor 136. A secondary winding 142 of the transformer 140 is connected to the center conductor of the coaxial cable 14 by means of a second coupling capacitor 144. The transformer 140 is a step down transformer that matches the output impedance of the amplifier 130 to the low impedance of the voltage regulator terminated cable 14. The operation of the telemetry and mixer circuits is similar to the operation of the telemetry and mixer circuits described in the incorporated reference.

In operation, the switching regulator 96 receives power from the center conductor of the cable 14 and applies a regulated direct current potential to the amplifiers in the neutron detector-amplifier circuit 32 and the gamma ray detector-amplifier 40, the neutron telemetry circuit 38, the gamma ray telemetry circuit 48 and the mixer 50. Random pulses are generated by the neutron and gamma ray detector-amplifiers 32 and 40. The random pulses derandomized by the telemetry circuits 38 and 40 which provide frequency shift keyed telemetry signals to the mixer 50. The two telemetry signals, one at 16 kilohertz and one at 20 kilohertz are combined by the mixer 50 and applied to the cable 14 for transmission to the surface.

At the surface unit 10, the telemetry signals from the down hole probe 12 are applied to the emitter of the transistor 78 via a diode 20. Because the emitter presents a low impedance termination to the cable 14, the telemetry voltage appearing at the emitter of the transistor 78 and across the cable is very small. As a result, the shunt capacitance of the cable 14, represented by a plurality of capacitors 150, does not appreciably affect the telemetry signals because the low terminating impedance presented by the transistor 78 is lower than the impedance of the capacitors 150, and most of the signal current flows through the base emitter junction of the transistor 78 rather than the shunt capacitance 150. This feature provides a significant advantage over prior art long cable telemetry systems which are terminated by a high impedance circuit. In such systems, for cables much longer than a few thousand feet, the impedance of the shunt capacitance of the cable becomes significant, and most of the telemetry signal is shunted to ground by the shunt capacitance.

The base of the transistor 78 is bypassed to ground by means of a capacitor 152. This permits the transistor 78 to operate as a common base amplifier to signals applied to the emitter thereof by the cable 14. In a common base amplifier, the current flowing through the collector circuit of the amplifier is substantially equal to the current flowing through the emitter circuit of the amplifier. Because of the high impedance of the constant current source 66, the current variations resulting from the telemetry signals applied to the transistor 78 result in large voltage changes at the junction of the collectors of the transistors 68 and 78 as the constant current source 66 attempts to keep the current constant. As a result, the low voltage current mode signal applied to the transistor 78 is transformed by the transistor 78 to a variable voltage signal. The variable voltage signal may then be applied to the demultiplexer circuitry 22 by means of the coupling capacitor 24 and recorded by the recorder 28.

C. Casing Collar Locator

Because of the problems resulting from the heat contained by the Dewar container 54, it is desirable to reduce the number of components, and hence the power dissipation, within the Dewar container 54 to an absolute minimum. As a result, the casing collar location circuitry has been placed outside of the Dewar container 54. The casing collar location circuitry includes the casing collar detector 56 which includes a casing collar detector coil 154 and a pair of magnets 156 and 158. As the probe 12 is lowered through the casing 60, a magnetic field is set up between the magnets 156 and 158 through the coil 154. The magnetic circuit is completed by the casing 60. Whenever the probe passes one of the casing collars 58, the magnetic impedance of the casing changes, thereby changing the flux through the coil 154. This results in an electrical impulse being generated by the coil 154 and applied to the casing collar amplifier 62.

The casing collar amplifier 62 contains a plurality of amplifiers which are represented in FIG. 2 by a pair of amplifiers 160 and 162. The amplifiers 160 and 162 may be conventional amplifiers, and in a preferred embodiment, field effect transistors are used as the active elements within the amplifiers 160 and 162. The field effect transistors are particularly useful because of their excellent thermal drift properties, and their high input impedance which does not load down the casing collar signals from the coil 154.

Because the amplifier 162 is located outside of the Dewar container 54, a simple zener diode voltage regulator comprising the zener diodes 164, 166 and 168 may be used. This is because the heat generated by the zener diodes is not trapped by the Dewar container 54, but is allowed to escape into the ambient atmosphere. The zener diode 164 is connected to the power supply terminal and the output terminal of the amplifier 162 and serves the dual function of regulating the power supply voltage for the amplifier 162 and transmittting signals from the amplifier 162 to the cable 14. A diode 170 connected in series with the cable 14 and the amplifier 162 protects the amplifier 162 from reverse polarity voltages which may be inadvertently applied to the cable 14.

Because the casing collar locator circuit is located outside of the Dewar container 54, the casing collar locating coil 154 must be capable of withstanding the high temperatures present in deep wells. A typical casing collar locating coil 154 comprises a bobbin 155 wound with ten to twenty-six thousand turns of 39 insulated copper wire 157. Because of the large number of turns of relatively fine wire used, the thermal cycling resulting from repeated well loggings can cause the wire 157 of the coil 154 to open or to short between adjacent coils or layers of turns. Accordingly, in order to extend the operating life of the casing collar detecting coils, the coil 154 (FIG. 3) is impregnated with a mixture of xylene and a silicon compound known by the trademark Silicoat. The impregnation process is accomplished by immersing each coil in a mixture comprising six to eight parts by volume of Silicoat and one part xylene. The immersed coils are then placed in a vacuum chamber for approximately 45 minutes to remove any entrapped air from around the windings. Subsequently, the coils are removed from the mixture and placed in a 400° oven for about three hours. Finally, the coils are covered with an additional layer of Silicoat and a Teflon covering. The curing at elevated temperatures causes the impregnating mixture to cure while the copper wires are in the same expanded state as they would be in a high temperature bore hole. As a result, additional impregnating compound is deposited between windings, and the contraction of the windings that occurs when a coil is removed from a high temperature bore hole is not as likely to cause a short circuit between windings.

While certain preferred embodiments of the invention have been described by way of illustration, many modifications will occur to those skilled in the art; it will be understood, of course, that it is not desired that the invention be limited thereto, since modifications may be made, and it is, therefore, contemplated by the appended claims to cover any such modifications as fall within the true scope and spirit of the invention.

What is claimed as new and desired to be secured by Letters Patent of the United States is:

1. In a telemetry system having a remote unit connected to a base unit by means of a single cable, a system for simultaneously transferring power from said base unit to said remote unit and telemetry signals from said remote unit to said base unit via said cable, a transmission system comprising:

a power source having a high impedance for providing a substantially constant current output terminal located at said base unit;

a voltage regulator circuit connected in tandem with said high impedance power source and said cable, said voltage regulator circuit having an input connected to the output terminal of said power source and an output connected to said cable, the impedance of the output voltage regulator circuit being substantially lower than the impedance of said power source; and a telemetry monitoring circuit connected to the junction of the output terminal of said power source and the input of said voltage regulator circuit.

2. A transmission system as recited in claim 1 wherein said power source includes a constant current source, said constant current source having an output connected to said output terminal.

3. A transmission system as recited in claim 1 wherein said voltage regulator circuit includes a regulating element having a pair of main terminals connected in series between said cable and the output terminal of said power source.

4. A transmission system as recited in claim 3 wherein said regulating element includes an amplifier connected in a common base configuration.

5. A transmission system as recited in claim 4 wherein the input of said common base amplifier is electrically coupled to said cable and the output of said common base amplifier is electrically coupled to said power source and said telemetry monitoring circuit.

6. A transmission system as recited in claim 5 wherein said common base amplifier has an emitter circuit and a collector circuit, and wherein said emitter circuit is electrically coupled to said cable and said collector circuit is electrically coupled to said power source, each by means of a direct current conductive connection.

7. A transmission system as recited in claim 1 further including a second voltage regulator located within said remote unit and electrically connected to said cable.

8. A transmission system as recited in claim 7 further including a telemetry signal generating system electrically coupled to said second voltage regulator and powered thereby.

9. A transmission system as recited in claim 7 wherein said second voltage regulator is a switching regulator.

10. A transmission system as recited in claim 8 further including means responsive to the output voltage of said second voltage regulator for disabling said telemetry signal generating system when said output voltage exceeds a predetermined level.

11. A transmission system as recited in claim 8 wherein said remote unit includes a thermally insulated housing, and wherein said second voltage regulator and said telemetry signal generating system are located within said housing.

12. A transmission system as recited in claim 11 further including means responsive to the temperature within said thermally insulated housing for disabling said second voltage regulator and said telemetry signal generating system when said temperature exceeds a predetermined level.

13. A transmission system as recited in claim 12 wherein said temperature responsive means includes means for shunting said cable when said temperature exceeds a predetermined level.

14. A transmission system as recited in claim 11 wherein said remote unit further includes a casing collar locating circuit electrically coupled to said cable.

15. A transmission system as recited in claim 14 wherein said casing collar locating circuit includes a casing collar detector coil.

16. A transmission system as recited in claim 15 wherein said casing collar detector coil is located outside of said thermally insulated housing.

17. A transmission system as recited in claim 16 wherein said casing collar detector coil comprises a plurality of turns of fine wire vacuum impregnated in a silicon compound and curved at elevated temperatures.

18. In a well logging system of the type having a subsurface unit having means for providing gamma ray and neutron representative signals, a surface unit having logging apparatus responsive to such gamma ray and neutron representative signals, and a cable interconnecting said probe and said surface unit, said cable having a single conductor for transferring both said gamma ray and neutron representative signals to said surface unit, the improvement comprising:

means for applying power to said subsurface unit located in said surface unit, said power applying means including a source of direct current, said source having a high output impedance for providing a substantially constant output current, and a voltage regulator having an input port and a low impedance output port, said input port being direct current coupled to said direct current source to form a junction and said output port being direct current coupled to said single conductor, said logging apparatus being electrically coupled to the junction of said direct current source and said voltage regulator; and a second voltage regulator located within said subsurface unit and direct current coupled to said single conductor.

19. The improvement recited in claim 18 wherein said second voltage regulator is a switching regulator and said subsurface unit includes a thermally insulated housing surrounding said gamma ray and said neutron signal providing means and said switching regulator.

20. The improvement recited in claim 18 wherein said gamma ray and neutron signal providing means is electrically connected to said switching regulator to be powered thereby and to said single conductor for applying signals thereto.

21. The improvement recited in claim 20 further including voltage and temperature responsive means connected to said single conductor and located within said thermally insulated housing, said voltage and temperature responsive means being operative to shunt said cable when the magnitude of the direct current voltage provided by said switching regulator exceeds a predetermined level and when the temperature within said housing exceeds a predetermined level.

22. The improvement recited in claim 21 wherein said voltage and temperature responsive means includes a controlled rectifier connected across said cable.

23. The improvement recited in claim 20 wherein said subsurface unit includes casing collar locating apparatus disposed outside of said thermally insulated housing and electrically coupled to said cable, said casing collar locating apparatus including a casing collar detecting coil having a bobbin and a plurality of turns of fine wire wound around said bobbin, said bobbin and said wire being vacuum impregnated with a silicon compound and cured at elevated tempertures.

24. The method of logging the characteristics of a bore hole comprising the steps of:
supporting by means of a cable, a subsurface logging unit within the bore hole;
providing a substantially constant current source having a high output impedance;
converting the output impedance of the current source from high output impedance to a low output impedance
powering the subsurface logging unit by applying a substantially constant voltage from the low impedance output to the surface end of one conductor of said cable;
applying a current mode signal indicative of said characteristics to the down hole end of said one conductor; and
detecting the current mode signal at the surface end of said one conductor.

25. The method recited in claim 24 wherein the method of detecting said current mode signal comprises the steps of transforming said current mode signal to a voltage mode signal and detecting said voltage mode signal.

26. The method recited in claim 25 further including the step of regulating the voltage at the down hole end of said one conductor.

27. The method recited in claim 26 wherein said regulation of the voltage at the down hole end of said one conductor is done with a switching regulator.

* * * * *